April 6, 1943.  A. GRUENHUT  2,315,954
AUTOMATIC REWIND FILM CARRIER
Filed March 6, 1941
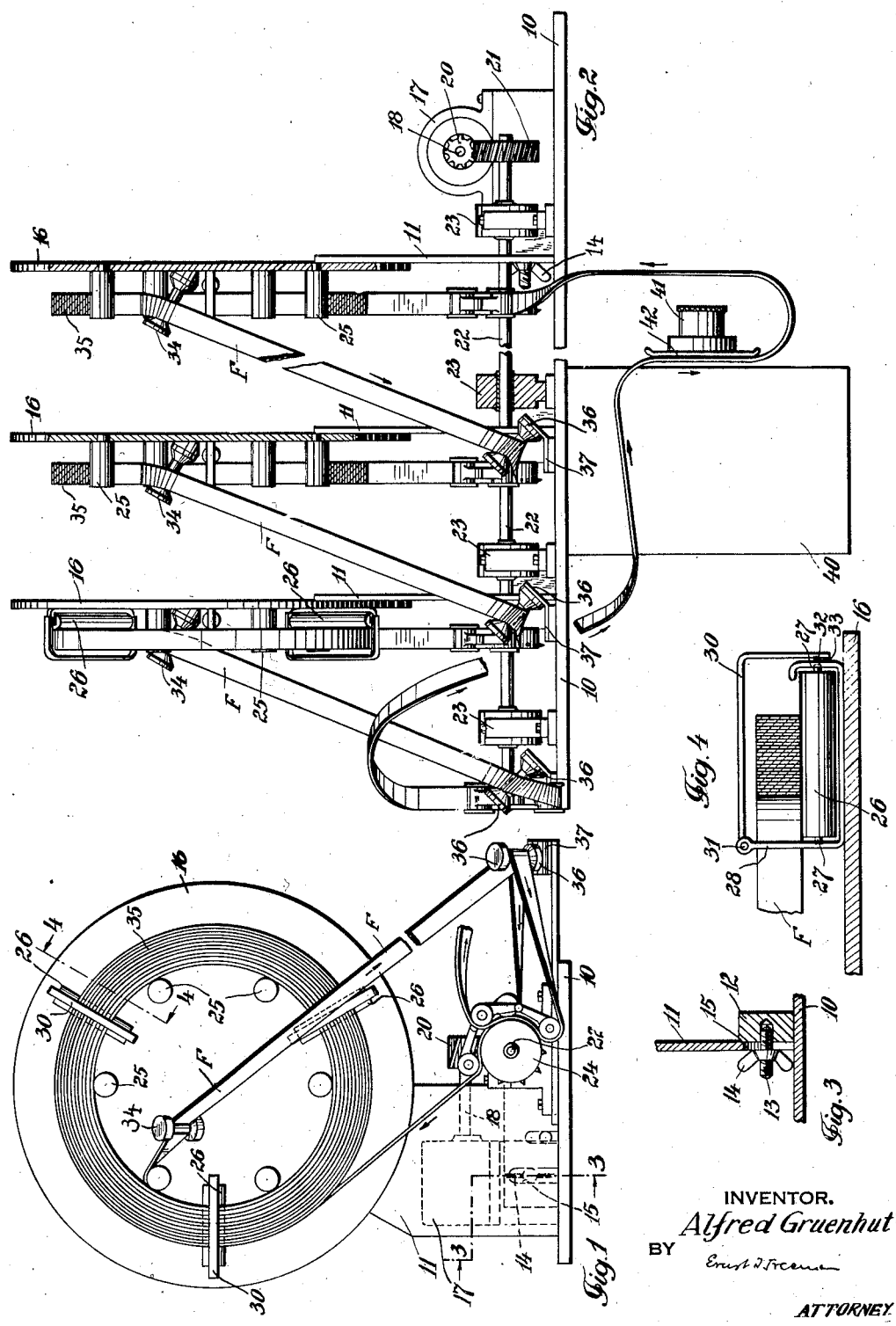
INVENTOR.
Alfred Gruenhut
BY
ATTORNEY Patented Apr. 6, 1943

2,315,954

UNITED STATES PATENT OFFICE 2,315,954

AUTOMATIC REWIND FILM CARRIER

Alfred Gruenhut, New York, N. Y., assignor, by mesne assignments, to Gertrude Israel, New York, N. Y.

Application March 6, 1941, Serial No. 381,975

3 Claims. (Cl. 88—18.7)

This invention relates to improved film magazines, and more particularly it relates to a film carrier of the type where an endless strip of film is moved through the film carrier as well as through a projecting apparatus.

In film carriers of this type it is most essential to prevent jamming and tightening of the film during its passage through the film magazine. Attempts have been made to provide an automatic rewind film carrier of the above type where a plurality of annular film coils are arranged concentrically to each other on a single base plate. However, these prior devices have the drawback that they are unsuitably large and heavy, and, therefore, they cannot be used in connection with some types of motion picture projecting apparatus.

In accordance with the present invention I provide a plurality of film magazines, each of which carries one annular film coil. Each of the film magazines carries a relatively short length of film that may, for instance, be between 100 and 200 ft. Nevertheless, the total length of film carried by the improved film carrier may be very considerable depending upon the number of film carriers used.

The individual film magazines form independent units which can be separately removed together with the film mounted thereon. All the individual film magazines are arranged side by side and are driven by the same driving means. Thus, the synchronous movement of the film through the film carrier and the projecting apparatus is assured. The automatic rewind film carrier of the invention has been designed particularly for use with a coin operated motion picture machine which is adapted to play in succession a plurality of short features which may each have a length of about 100 to about 200 ft. Hence each feature will run for a time of between three and five minutes. Accordingly, it is very advantageous to design each of the individual film magazines so that it carries just one or two features which may then easily be exchanged by removing the film magazine together with the film carried thereby, and by severing the film from the film portions carried by adjacent film magazines.

It is accordingly an object of the invention to provide an improved automatic rewind film carrier which will positively prevent jamming or tightening of the film during its operation.

Another object of the invention is to provide a film carrier of the type referred to which will take up a minimum of space so that it can be used with any kind of motion picture machines.

A further object of the invention is to provide a rewind film carrier that is automatic in operation and will not require any supervision.

Still an object of the invention is to provide a film carrier of the above type which is provided with a plurality of individual film magazines, each of which carries a predetermined length of film, each unit being adapted to be exchanged.

These and further objects of the invention will become more evident in the following description of a preferred embodiment of the invention illustrated in the drawing, wherein:

Fig. 1 is a front view of the film carrier of the invention,

Fig. 2 is a side view of my improved automatic rewind film carrier, parts being broken away, Fig. 3 is a section on the line 3—3 of Fig. 1 to show a detail of construction, Fig. 4 is a section on the line 4—4 of Fig. 1 showing the construction of one of the radial rollers for supporting the annular film coil.

Referring to the drawing and more particularly to Figs. 1 and 2, the film carrier of the invention is provided with a base plate 10. A plurality of upright plates 11 is removably mounted on base plate 10, as shown more particularly in Fig. 3. Block 12 is secured to plate 10 in any suitable way and has a threaded bolt 13 projecting therefrom. Winged nut 14 is adapted to engage threaded bolt 13. Upright plate 11 has a longitudinal slot 15, as clearly shown in Fig. 1. When winged nut 14 is loosened, upright plate 11 can be removed by simply lifting it from base plate 10.

As shown in Figs. 1 and 2, a circular plate 16 is secured to each upright plate 11. Circular plate 16 serves as carrier for one of the annular film coils as will be described hereinafter. Electric motor 17 is mounted on base plate 10 and has a shaft 18 on which a spiral gear 20 is secured. Spiral gear 20 meshes with spiral gear 21 arranged at right angles thereto. Spiral gear 21 is keyed to drive shaft 22 which serves as the general drive for the endless film strip F. Drive shaft 22 is mounted in a plurality of bearings 23 which in turn are secured to base plate 10. A plurality of drive sprockets 24 is secured to shaft 22 for the purpose to positively feed the film from one annular coil into the next coil.

Each of the circular plates 16 is provided with a plurality of rollers 25 which are arranged about a circle. Rollers 25 preferably have ball bearings, or they may be provided with self-lubricating bearings of the type known as Oilite bearings. A plurality of radial rollers 26 is spaced at equal distances about the outer circumference of circular plate 16. The manner of mounting radial rollers 26 is shown more particularly in Fig. 4. Each of the radial rollers 26 has two short pins 27 which are mounted in suitable recesses of frame 28 secured to plate 16. A substantially L-shaped metal frame 30, hinged at 31 to frame 28. L-shaped frame 30 has a recess 32 that cooperates with a projection 33 on frame 28. When frame 30 is lifted, its recess 32 disengages projection 33 and thus access to the annular film coil 35 may be had.

As shown in Fig. 2 rollers 25 are spaced a certain distance from circular plate 16 so that each of the annular film coils 35 is supported by radial rollers 26 and wound about rollers 25. Each of the circular plates 16 has a roller 34 which is arranged inside of the circle formed by rollers 25. The axes of rollers 34 are oblique with regard to a horizontal plane. Each roller 34 is rotatably mounted on one of the circular plates 16 and serves to move the film F out of the plane of annular coil 35. Another set of oblique rollers 36 is mounted by means of angle iron 37 on base plate 10 and cooperates with roller 34.

The operation of my improved automatic rewind film carrier will now be explained.

Drive shaft 22 is driven by motor 17 by the intermediary of meshing helical gears 20 and 21. Rotation of shaft 22 causes sprocket wheels 24 to rotate. As will be seen from an inspection of Figs. 1 and 2, the film F leaving one of the annular film coils 35 is first guided over obliquely arranged roller 34, wherefrom it moves over oblique roller 36 adjacent the next upright plate 11. From roller 36 the film F moves about sprocket wheel 24 and is passed onto the outer periphery of the subsequent film coil 35. The direction of movement of film F has been indicated by arrows. Film coil 35 is supported by radial rollers 26. Now the film is taken from the inner periphery of the coil and passes over obliquely arranged roller 34 onto the next film coil.

From the last film coil, viz. the one on the left of Fig. 2, the film also passes over film sprocket 24 as indicated in Fig. 1. Therefrom the film passes through the film projector schematically indicated at 40. Film projector 40 has a lens 41 and a film gate 42 through which the film is intermittently fed in a manner well known to those skilled in the art. After the film has passed from above through film gate 42 it is fed over the sprocket 24 arranged at the right hand side of Fig. 2. Since the film projector is no object of this invention and is well known to the man skilled in the art, it has only been indicated schematically. It will, however, be understood that the film projector may be arranged on any other suitable place instead of below base plate 10.

In Fig. 2 only three film carrying units or magazines have been shown. However, it is evident that any number of film units may be used, depending upon the total length of the endless film strip or upon the number of individual subjects carried by the rewinder of the invention.

It will now be appreciated that the film moves with a synchronous speed through the various film magazines, due to the fact that the film is positively advanced by sprockets 24 which are driven with a uniform speed by motor 17.

The arrangement of the endless film strip in a plurality of film coils, each of which is mounted on a separate unit, has the following advantages. By unscrewing winged nut 14 circular plate 16 together with the film mounted thereon may be removed from base plate 10 if the film is severed from the preceding and following film portions. Now a new film carrying unit or magazine may be secured to base plate 10 which may bear a different film subject. The film on the new film magazine must be spliced onto the severed ends of the adjacent film strips. Thus, it is easily possible to exchange any of the short features of the film carrier for another short subject.

I have found by various tests that my improved film carrier will run satisfactorily if base plate 10 is in a vertical position. Suitably the film carrier is rotated through 90° in a clockwise direction from the position of Fig. 2. In this position the film will bear against radial rollers 26 due to its weight. In case a limited space only is available for my automatic rewinder this arrangement may be preferred.

Various changes and modifications may be made to the details of construction of the invention without departing from the broader spirit and scope thereof, as set forth in the following claims.

I claim:

1. A film carrier comprising a base plate, a plurality of stationary film carrier plates secured to said base plate, each of said film carrier plates having a circular set of idle rollers rotatably mounted thereon, each set of rollers supporting an annular film coil, said film coils forming portions of an endless film strip, a plurality of radial rollers on each of said film carrier plates for supporting the edges of the film coils on said carrier plates, a frame consisting of two portions for each of said radial rollers, the lower portion of each of said frames being secured to one of said film carrier plates and embracing the axis of its radial roller, the upper portion of each of said frames being hinged to its lower portion and having a snap engagement therewith to permit opening of the frame for the purpose of removing one of said annular film coils from its carrier plate, a drive shaft, means for rotating said drive shaft, a plurality of sprocket wheels on said drive shaft, each of said sprocket wheels being arranged to feed the film from the inner periphery of one of said film coils to the outer periphery of the adjacent film coil.

2. A film carrier comprising a support, a plurality of stationary film carrier plates secured vertically to said support, each of said film carrier plates having a circular set of idle rollers rotatably mounted thereon for supporting an annular film coil, said film coils forming portions of an endless film strip, an idle guide roller rotatably mounted on each of said film carrier plates for moving the film out of the plane defined by its associated annular film coil, the axes of said guide rollers being oblique with regard to planes passing through said circular sets of rollers, a plurality of radial rollers on each of said film carrier plates for supporting the edges of an associated film coil, a frame for each of said radial rollers comprising two portions, the lower portion of each of said frames being secured to one of said film carrier plates and embracing the axis of its radial roller, the upper portion of each of said frames being hinged to its lower portion and having a snap engagement therewith to permit opening of the frame for removing one of said annular film coils from its carrier plate, a drive shaft, means for rotating said drive shaft, and a plurality of sprocket wheels on said drive shaft, each of said sprocket wheels being arranged to feed the film from the inner periphery of one of said film coils to the outer periphery of the adjacent film coil.

3. In combination, a film projector and a film carrier including a plurality of stationary film magazines each having a set of idle rollers journalled in a circle about a common center, each set of rollers supporting an annular film coil, said film coils forming portions of an endless film strip, a plurality of radial rollers on each of said film magazines for supporting the edges of the film coil associated therewith, a frame for each of said radial rollers comprising two portions, the lower portion of each of said frames being secured to one of said film magazines and embracing the axis of its radial roller, the upper portion of each of said frames being hinged to its lower portion and having a snap engagement therewith to permit opening of the frame for removing one of said annular film coils, a drive shaft, means for rotating said drive shaft, a plurality of sprocket wheels on said drive shaft, each of said sprocket wheels being arranged to feed the film from the inner periphery of one of said film coils to the outer periphery of the adjacent film coil, an idle guide roller rotatably mounted on each of said film magazines for moving the film out of the plane defined by the annular film coil supported on said film magazine, another series of idle guide rollers each being arranged adjacent one of said sprocket wheels, the axes of said guide rollers being inclined with regard to planes passing through said circular sets of rollers, and means for feeding the film on the last of said film magazines through said projector to the first of said film magazines.

ALFRED GRUENHUT.